United States Patent
Kim et al.

(10) Patent No.: US 11,979,227 B2
(45) Date of Patent: May 7, 2024

(54) METHOD AND APPARATUS FOR RELAYING DATA IN COMMUNICATION SYSTEM

(71) Applicant: ELECTRONICS AND TELECOMMUNICATIONS RESEARCH INSTITUTE, Daejeon (KR)

(72) Inventors: Jun Hyeong Kim, Daejeon (KR); Gyu Il Kim, Daejeon (KR); Go San Noh, Daejeon (KR); Hee Sang Chung, Daejeon (KR); Dae Soon Cho, Daejeon (KR); Sung Woo Choi, Daejeon (KR); Seung Nam Choi, Daejeon (KR); Jung Pil Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 140 days.

(21) Appl. No.: 17/541,363

(22) Filed: Dec. 3, 2021

(65) Prior Publication Data

US 2022/0182173 A1     Jun. 9, 2022

(30) Foreign Application Priority Data

Dec. 9, 2020 (KR) .................. 10-2020-0171780
Nov. 29, 2021 (KR) .................. 10-2021-0166962

(51) Int. Cl.
*H04L 1/00* (2006.01)
*H04B 7/155* (2006.01)
(Continued)

(52) U.S. Cl.
CPC ........... *H04L 1/0009* (2013.01); *H04B 7/155* (2013.01); *H04W 72/23* (2023.01); *H04W 88/04* (2013.01)

(58) Field of Classification Search
CPC ... H04L 1/0009; H04L 1/0003; H04L 1/0025; H04L 2001/0097; H04B 7/155;
(Continued)

(56) References Cited

U.S. PATENT DOCUMENTS 10,631,346 B2   4/2020   Hampel et al.
10,833,736 B2   11/2020  Hong et al.
(Continued)

OTHER PUBLICATIONS

Petar Popovski et al., "Physical Network Coding in Two-Way Wireless Relay Channels", ICC 2007.

*Primary Examiner* — Charles C Jiang
*Assistant Examiner* — Debebe A Asefa
(74) *Attorney, Agent, or Firm* — LRK PATENT LAW FIRM

(57) ABSTRACT

An operation method of a relay node may include: receiving, from a first communication node, first data composed of n bits; receiving, from a second communication node, second data composed of m bits; in response to determining that n is greater than m, generating first T-data of m bits excluding (n-m) bits from the n-bits of the first data and first R-data of (n-m) bits; generating third data by performing a network coding operation on the first T-data and the second data; transmitting the third data to the first communication node; and transmitting the third data and the first R-data to the second communication node.

20 Claims, 14 Drawing Sheets

(51) Int. Cl.
*H04W 72/23* (2023.01)
*H04W 88/04* (2009.01)

(58) Field of Classification Search
CPC .. H04B 7/15521; H04W 72/23; H04W 88/04; H04W 84/047
See application file for complete search history.

(56) References Cited

U.S. PATENT DOCUMENTS

| | | |
|---|---|---|
| 10,869,243 B2 | 12/2020 | Kim |
| 2008/0062857 A1* | 3/2008 | Monogioudis .... H04L 27/26524 370/208 |
| 2009/0268790 A1* | 10/2009 | Josiam ............... H04B 7/15521 375/211 |
| 2013/0148563 A1* | 6/2013 | Brueck ................ H04L 1/1854 370/312 |
| 2018/0302908 A1* | 10/2018 | Aijaz ...................... H04L 45/28 |
| 2020/0177242 A1 | 6/2020 | Kim et al. |
| 2020/0235788 A1 | 7/2020 | Rajagopal et al. |
| 2020/0374958 A1 | 11/2020 | Liu et al. |
| 2020/0389806 A1 | 12/2020 | Charipadi et al. |
| 2021/0006371 A1 | 1/2021 | Raghothaman et al. |
| 2021/0377885 A1* | 12/2021 | Dortschy ............. H04W 88/14 |

* cited by examiner

[non-TDM multiplexing scheme option 1: MT-TX/DU-TX]

[non-TDM multiplexing scheme option 2 : MT-TX/DU-RX]

[non-TDM multiplexing scheme option 3 : MT-RX/DU-TX]

[non-TDM multiplexing scheme option 4 : MT-RX/DU-RX]

METHOD AND APPARATUS FOR RELAYING DATA IN COMMUNICATION SYSTEM

CROSS-REFERENCE TO RELATED APPLICATIONS

This application claims priority to Korean Patent Applications No. 10-2020-0171780 filed on Dec. 9, 2020, and No. 10-2021-0166962 filed on Nov. 29, 2021 with the Korean Intellectual Property Office (KIPO), the entire contents of which are hereby incorporated by reference.

BACKGROUND

1. Technical Field

The present disclosure relates to a technique for relaying data in a communication system, and more particularly, to a technique for relaying data based on network coding (NC) and/or superposition coding.

2. Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

The communication system (hereinafter, a new radio (NR) communication system) using a higher frequency band (e.g., a frequency band of 6 GHz or above) than a frequency band (e.g., a frequency band of 6 GHz or below) of the long term evolution (LTE) (or, LTE-A) is being considered for processing of soaring wireless data. The 5G communication system can support enhanced mobile broadband (eMBB), ultra-reliable low-latency communication (URLLC), massive machine type communication (mMTC), and the like.

Meanwhile, a relay node may be introduced in a communication system. The relay node may receive first data from a first communication node at a first time, and may receive second data from a second communication node at a second time. The relay node may transmit the first data to the second communication node at a third time, and may transmit the second data to the first communication node at a fourth time. Since at least four slots are required for the above-described operation of data relaying, the efficiency of resource use may be reduced.

SUMMARY

Accordingly, exemplary embodiments of the present disclosure are directed to providing methods and apparatuses for relaying data based on network coding (NC) and/or superposition coding in a communication system.

According to a first exemplary embodiment of the present disclosure, an operation method of a relay node in a communication system may comprise: receiving, from a first communication node, first data composed of n bits; receiving, from a second communication node, second data composed of m bits; in response to determining that n is greater than m, generating first truncated (T)-data of m bits excluding (n-m) bits from the n-bits of the first data and first remaining (R)-data of (n-m) bits; generating third data by performing a network coding (NC) operation on the first T-data and the second data; transmitting the third data to the first communication node; and transmitting the third data and the first R-data to the second communication node, wherein each of n and m is a natural number.

The operation method may further comprise: receiving, from the second communication node, a child scheduling request (C-SR) indicating that the second data exists in the second communication node; transmitting, to the first communication node, control information including information on the C-SR; and receiving, from the first communication node, NC downlink control information (NC-DCI) including resource allocation information of the second data, wherein the receiving of the second data is performed based on the resource allocation information included in the NC-DCI.

The resource allocation information may be an offset between a reception time of the NC-DCI and a reception time of the second data.

The control information may further include a relay (R)-SR indicating whether uplink data to be transmitted to the first communication node exists in the relay node, and the information on the C-SR may include a number of C-SR(s) and an identifier of each of one or more second communication nodes having transmitted the C-SR(s).

When a maximum number of C-SR(s) reportable through the control information is k, the number of C-SR(s) received from the relay node is p, and p is greater than k, k C-SR(s) may be selected from among p C-SR(s) received from the relay node, and the control information may include information on the selected k C-SR(s).

The NC-DCI may further include at least one of resource allocation information of the first data, resource allocation information of the third data, a power coefficient for a superposition coding (SPC) operation, an identifier of the second communication node, modulation and coding scheme (MCS) information, or combinations thereof.

The first data and the NC-DCI may be received in a same slot.

The third data may be transmitted through a first resource region, the first R-data may be transmitted through a second resource region, and the first resource region and the second resource region may be independently configured.

The transmitting of the third data and the first R-data may comprise: identifying an overlapping third resource region between a first resource region to which the third data is mapped and a second resource region to which the first R-data is mapped; transmitting a result of an SPC operation on the third data and the first R-data to the second communication node through the third resource region; transmitting the third data to the second communication node through a remaining resource region excluding the third resource region from the first resource region; and transmitting the first R-data to the second communication node through a remaining resource region excluding the third resource region from the second resource region.

The third resource region may be configured in units of resource block groups (RBGs), and a power coefficient for the SPS operation may be configured for each RBG.

The first data may be received at a first time, the second data may be received at a second time, and a transmission operation to the first communication node and a transmission operation to the second communication node may be performed simultaneously.

When the communication system supports integrated access and backhaul (TAB) communication, the relay node may be an IAB node, the first communication node may be a parent node, and the second communication node may be a child node, and when the communication system supports sidelink communication, each of the relay node, the first communication node, and the second communication node may be a terminal performing the sidelink communication.

According to a second exemplary embodiment of the present disclosure, a relay node in a communication system may comprise: a processor; a memory electronically communicating with the processor; and instructions stored in the memory, wherein when executed by the processor, the instructions cause the relay node to: receive, from a first communication node, first data composed of n bits; receive, from a second communication node, second data composed of m bits; in response to determining that n is greater than m, generate first truncated (T)-data of m bits excluding (n-m) bits from the n-bits of the first data and first remaining (R)-data of (n-m) bits; generate third data by performing a network coding (NC) operation on the first T-data and the second data; transmit the third data to the first communication node; and transmit the third data and the first R-data to the second communication node, wherein each of n and m is a natural number.

The instructions may cause the relay node to: receive, from the second communication node, a child scheduling request (C-SR) indicating that the second data exists in the second communication node; transmit, to the first communication node, control information including information on the C-SR; and receive, from the first communication node, NC downlink control information (NC-DCI) including resource allocation information of the second data, wherein the receiving of the second data is performed based on the resource allocation information included in the NC-DCI.

The resource allocation information may be an offset between a reception time of the NC-DCI and a reception time of the second data.

The control information may further include a relay (R)-SR indicating whether uplink data to be transmitted to the first communication node exists in the relay node, and the information on the C-SR may include a number of C-SR(s) and an identifier of each of one or more second communication nodes having transmitted the C-SR(s).

When a maximum number of C-SR(s) reportable through the control information is k, the number of C-SR(s) received from the relay node is p, and p is greater than k, k C-SR(s) may be selected from among p C-SR(s) received from the relay node, and the control information may include information on the selected k C-SR(s).

The third data may be transmitted through a first resource region, the first R-data may be transmitted through a second resource region, and the first resource region and the second resource region may be independently configured.

In the transmitting of the third data and the first R-data, the instructions may cause the relay node to: identify an overlapping third resource region between a first resource region to which the third data is mapped and a second resource region to which the first R-data is mapped; transmit a result of an SPC operation on the third data and the first R-data to the second communication node through the third resource region; transmit the third data to the second communication node through a remaining resource region excluding the third resource region from the first resource region; and transmit the first R-data to the second communication node through a remaining resource region excluding the third resource region from the second resource region.

The third resource region may be configured in units of resource block groups (RBGs), and a power coefficient for the SPS operation may be configured for each RBG.

According to the exemplary embodiments of the present disclosure, when the size of the first data received from the first communication node is larger than the size of the second data received from the second communication node, the relay node may remove some bit(s) from the first data, thereby matching the size of the first data to the size of the second data. The relay node may generate network coding (NC) data by performing an NC operation on the first data and the second data having the same size. The relay node may transmit the NC data and some bit(s) using orthogonal resources. Alternatively, the relay node may generate a signal by performing a superposition coding (SPC) operation on the NC data and some bit(s), and may transmit the generated signal. Accordingly, the data relaying operation can be efficiently performed, the efficiency of resource use can be improved, and the performance of the communication system can be improved.

DETAILED DESCRIPTION OF THE EMBODIMENTS

Figure 1:
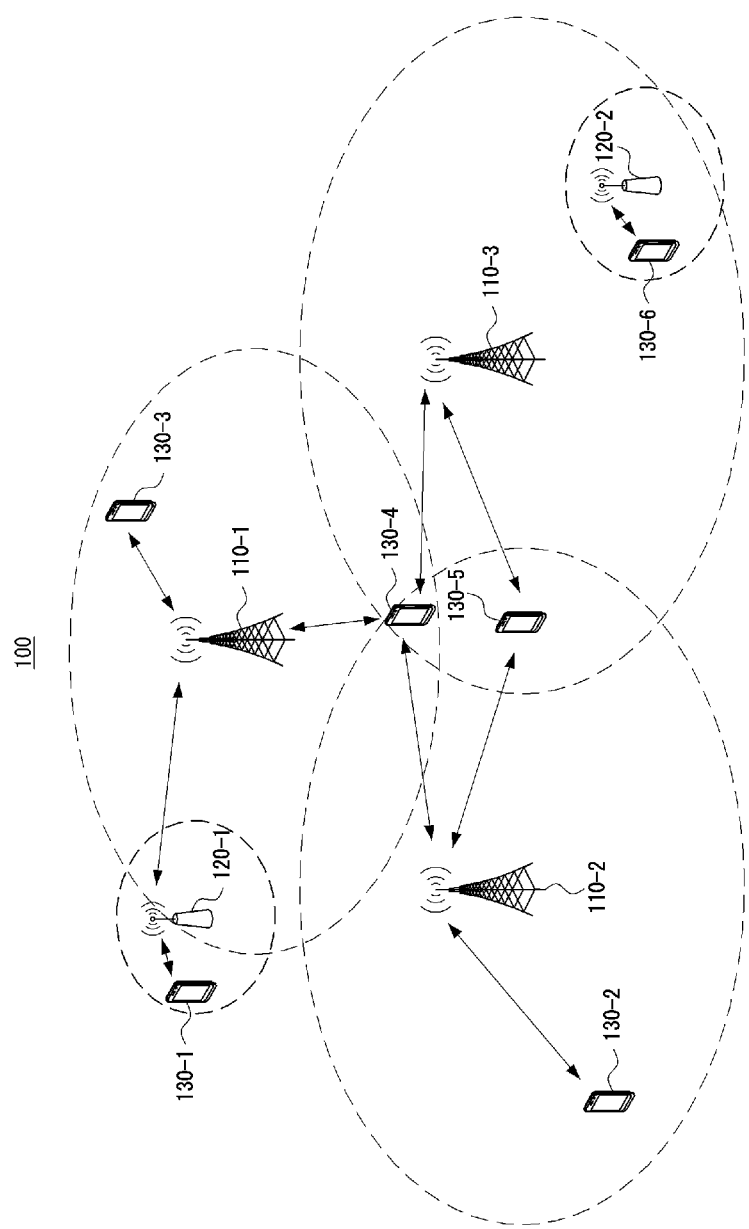
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system may be a 4G communication network (e.g., a long-term evolution (LTE) communication system or an LTE-advanced (LTE-A) communication system), a 5G communication network (e.g., a new radio (NR) communication system), or the like. The 4G communication system may support communication in a frequency band of 6 GHz or below. The 5G communication system may support communication in a frequency band of 6 GHz or above, as well as the frequency band of 6 GHz or below. The communication system to which the exemplary embodiments according to the present disclosure are applied is not limited to the contents described below, and the exemplary embodiments according to the present disclosure may be applied to various communication systems. Here, the communication system may be used in the same sense as a communication network. The 'LTE' may refer to the 4G communication system, LTE communication system, or LTE-A communication system, and the 'NR' may refer to the 5G communication system or NR communication system.

FIG. 1 is a conceptual diagram illustrating a first exemplary embodiment of a communication system.

Referring to FIG. 1, a communication system 100 may include a plurality of communication nodes 110-1, 110-2, 110-3, 120-1, 120-2, 130-1, 130-2, 130-3, 130-4, 130-5, and 130-6. In addition, the communication system 100 may further include a core network (e.g., serving-gateway (S-GW), packet data network (PDN)-gateway (P-GW), and mobility management entity (MME)). When the communication system 100 is the 5G communication system (e.g., NR system), the core network may include an access and mobility management function (AMF), a user plane function (UPF), a session management function (SMF), and the like.

The plurality of communication nodes 110 to 130 may support the communication protocols (e.g., LTE communication protocol, LTE-A communication protocol, NR communication protocol, etc.) defined by technical specifications of 3rd generation partnership project (3GPP). The plurality of communication nodes 110 to 130 may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA)

based communication protocol, or the like. Each of the plurality of communication nodes may have the following structure.

Figure 2:
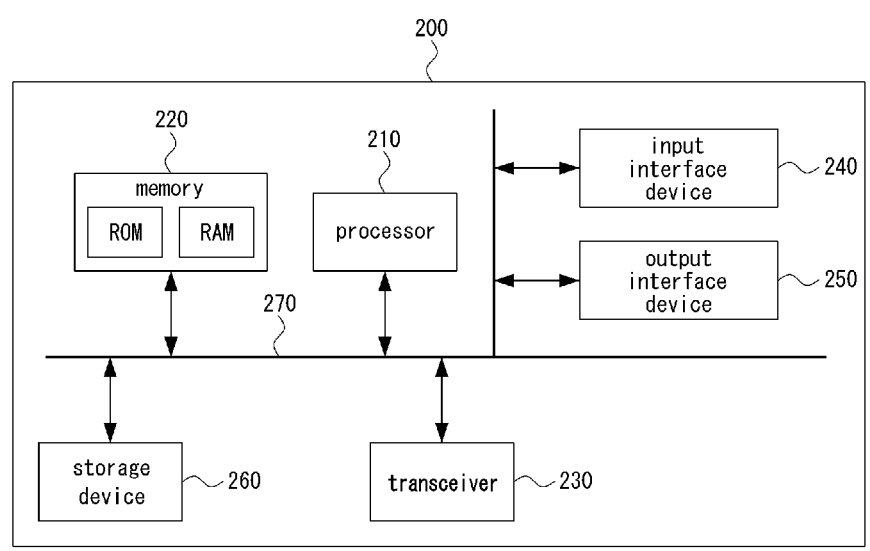
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, and the fifth terminal 130-5 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, an evolved Node-B (eNB), an advanced base station (BTS), a high reliability-base station (HR-BS), a base transceiver station (BTS), a radio base station, a radio transceiver, an access point, an access node, a radio access station (RAS), a mobile multi-hop relay base station (MMR-BS), a relay station (RS), an advanced relay station (ARS), a high reliability-relay station (HR-RS), a home NodeB (HNB), a home eNodeB (HeNB), a roadside unit (RSU), a radio remote head (RRH), a transmission point (TP), a transmission and reception point (TRP), a macro cell, a pico cell, a micro cell, a femto cell, or the like.

Each of the plurality of terminals 130-1, 130-2, 130-3, 130-4, 130-5, and 130-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on board unit (OBU), or the like.

In a communication system, a relay node may relay a signal between a base station and a terminal or between terminals. The relay node may be used for resolution of a shadow area, extension of a communication distance, extension of cell coverage, and/or improvement of a transmission capacity (throughput). A link between the base station and the relay node may be a backhaul link, and a link between the relay node and the terminal may be an access link. Each of the backhaul link and the access link may be a wireless link.

Figure 3A:
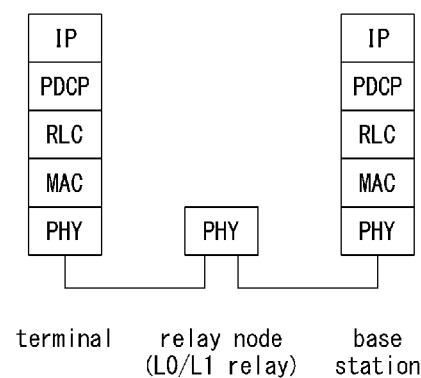
FIG. 3A is a conceptual diagram illustrating an L0/L1 relay in a communication system.
Figure 3B:
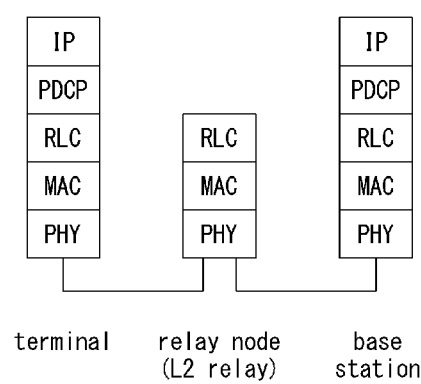
FIG. 3B is a conceptual diagram illustrating an L2 relay in a communication system.
Figure 3C:
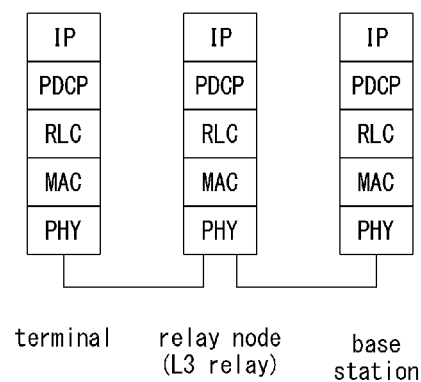
FIG. 3C is a conceptual diagram illustrating an L3 relay in a communication system.

FIG. 3A is a conceptual diagram illustrating an L0/L1 relay in a communication system, FIG. 3B is a conceptual diagram illustrating an L2 relay in a communication system, and FIG. 3C is a conceptual diagram illustrating an L3 relay in a communication system.

Referring to FIGS. 3A to 3C, relay types may be classified into L0/L1 relay, L2 relay, and L3 relay according to a physical layer function. A relay node supporting the L0/L1 relay may be a repeater. The repeater may simply amplify a received signal and retransmit the amplified signal. That is, the repeater may perform an amplify-and-forward (AF) function. The L0 relay may not support a power control function, time selective retransmission function, and/or frequency selective retransmission function. On the other hand, the L1 relay may support the power control function, time selective retransmission function, and/or frequency selective retransmission function.

A relay node supporting the L2 relay may decode a received signal, perform an error correction operation on a result of the decoding, perform an encoding operation on a result of the error correction operation, and transmit a result of the encoding operation. That is, the L2 relay may support a decode-and-forward (DF) function. The L3 relay may support most functions supported by a base station.

Meanwhile, an integrated access and backhaul (IAB) node may be introduced in a communication system. The IAB node may support radio access using multi-hop relay-based integrated wireless backhaul and access links.

Figure 4A:
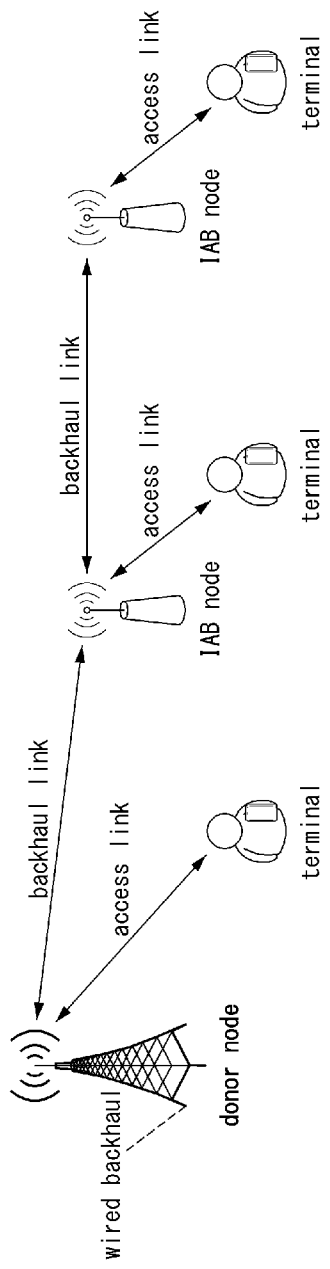
FIG. 4A is a conceptual diagram illustrating a first exemplary embodiment of an IAB network.
Figure 4B:
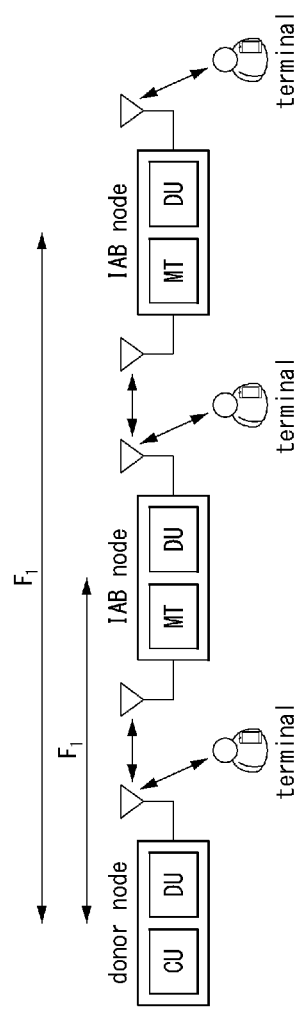
FIG. 4B is a conceptual diagram illustrating a structure of each communication node in the IAB network illustrated in FIG. 4A.

FIG. 4A is a conceptual diagram illustrating a first exemplary embodiment of an IAB network, and FIG. 4B is a conceptual diagram illustrating a structure of each communication node in the IAB network illustrated in FIG. 4A.

Referring to FIGS. 4A and 4B, an IAB node in an IAB network may perform a relay function. The IAB node may be a fixed relay node or a mobile relay node. A donor node may be connected to a network (e.g., core network) through a wired backhaul. The donor node may include a central unit (CU) and a distributed unit (DU). The IAB node may include a mobile-termination (MT) and a DU. The DU of the IAB node may form a cell to which other IAB nodes and/or terminals are connected. The MT of the IAB node may support a function of connecting to other IAB nodes and/or a function of connecting to the donor node. In addition, each of the donor node and the IAB node may be configured identically or similarly to the communication node 200 shown in FIG. 2.

The IAB node may form a cell by itself. A terminal connected to the cell of the IAB node may recognize the IAB node the same as a general base station. The IAB node may initially access the network (i.e., IAB network) using the same initial access procedure as the terminal. After the IAB node is connected to the network, it may receive necessary configuration information from the donor node. An IAB node (e.g., additional IAB node) may be connected to the network (i.e., IAB network) through a cell formed by another IAB node. That is, the IAB network may support multi-hop wireless backhauling technology.

Figure 5:
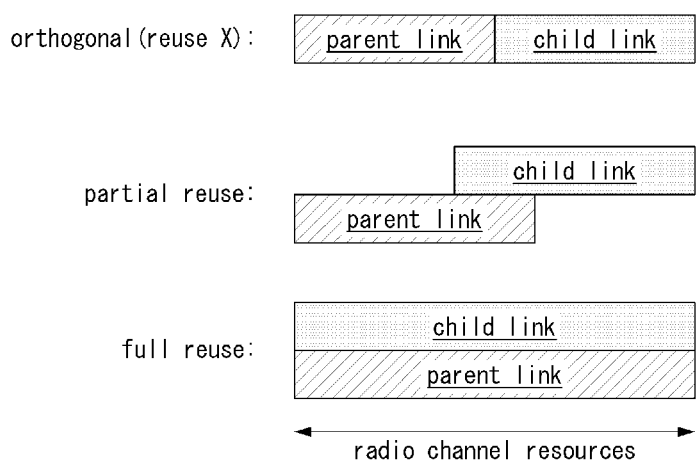
FIG. 5 is a conceptual diagram illustrating a method of multiplexing radio channel resources between a parent link and a child link of an IAB node.

FIG. 5 is a conceptual diagram illustrating a method of multiplexing radio channel resources between a parent link and a child link of an IAB node.

Referring to FIG. 5, frequency multiplexing of a backhaul link in an IAB network may support an in-band scheme and/or an out-band scheme. Time, frequency, and/or spatial multiplexing scheme may be used for radio channel resources of each of a parent link and a child link of the IAB node. In the in-band scheme, a partial reuse multiplexing scheme and/or a full reuse multiplexing scheme may be used. In this case, multiplexing constraints and/or interference issues between the access link and the backhaul link may be considered.

Figure 6:
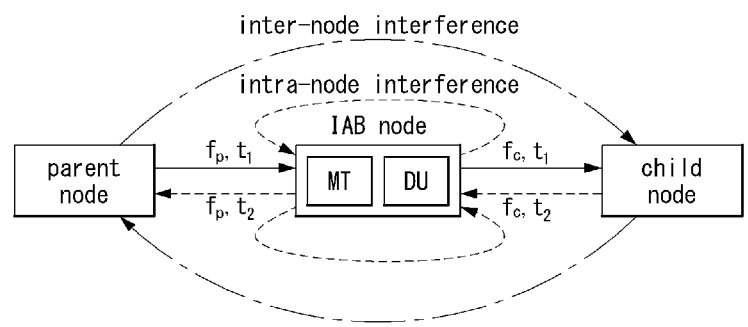
FIG. 6 is a conceptual diagram illustrating interference between communication nodes in an in-band full duplexing (IBFD) scheme.

FIG. 6 is a conceptual diagram illustrating interference between communication nodes in an in-band full duplexing (IBFD) scheme.

Referring to FIG. 6, when the IBFD scheme (e.g., 'MT-RX/DU-TX scheme' or 'MT-TX/DU-RX scheme') is used, intra-node interference and inter-node interference may occur. The IAB node may operate in the MT-RX/DU-TX scheme or the MT-TX/DU-RX scheme. Inter-node interference between a parent node and a child node may be similar to interference in a MIMO environment. In exemplary embodiments, the child node may refer to an access node. Management of inter-node interference may be relatively easy. Regarding intra-node interference, a transmission signal of the IAB node (i.e., communication node) may be received back at itself. That is, a transmission signal of the IAB node may act as interference on signals received from other communication nodes. A strength of an interference signal caused by the transmission signal of the IAB node may be greater than strengths of signals received from other communication nodes. The strength of the interference signal may exceed an acceptable range of automatic gain control (AGC). Therefore, when intra-node interference occurs, it may be difficult to demodulate a received signal.

When the IAB node operates in the MT-RX/DU-TX scheme or the MT-TX/DU-RX scheme, the corresponding IAB node may use the same radio resources (e.g., time resources, frequency resources, spatial resources) to perform downlink communication and uplink communication. In this case, a cross-link interference (CLI) may occur.

Figure 7A:
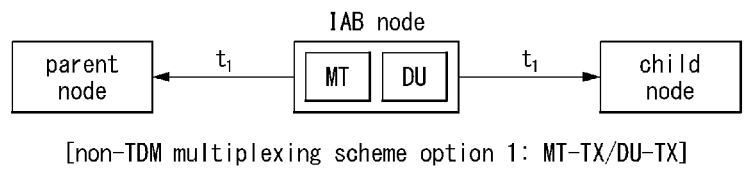
FIG. 7A is a conceptual diagram illustrating a non-time division multiplexing (non-TDM) scheme 1.
Figure 7B:
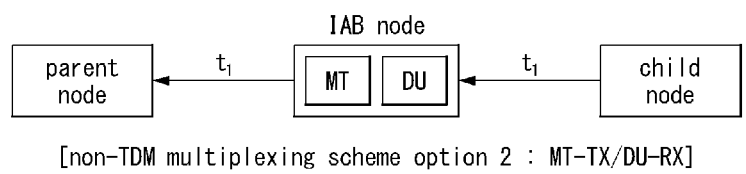
FIG. 7B is a conceptual diagram illustrating a non-TDM scheme 2.
Figure 7C:
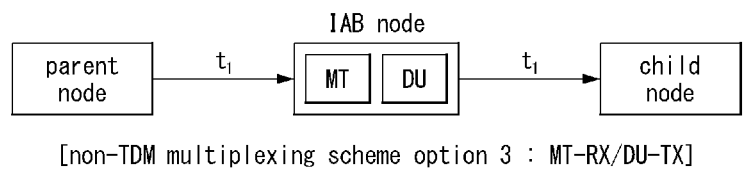
FIG. 7C is a conceptual diagram illustrating a non-TDM scheme 3.
Figure 7D:
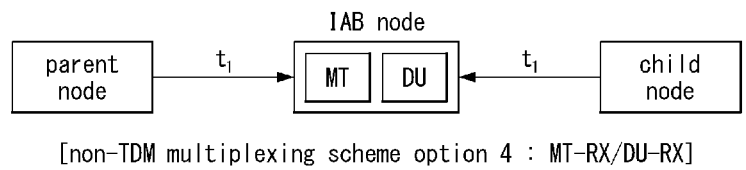
FIG. 7D is a conceptual diagram illustrating a non-TDM scheme 4.

FIG. 7A is a conceptual diagram illustrating a non-time division multiplexing (non-TDM) scheme 1, FIG. 7B is a conceptual diagram illustrating a non-TDM scheme 2, FIG. 7C is a conceptual diagram illustrating a non-TDM scheme 3, and FIG. 7D is a conceptual diagram illustrating a non-TDM scheme 4.

Referring to FIGS. 7A to 7D, an IAB node may support a non-TDM scheme (e.g., simultaneous operation scheme). The non-TDM scheme may be referred to as a non-TDM multiplexing option. In order to support the non-TDM schemes 1 to 4, a power control operation, a transmission/reception timing alignment operation, and the like may be performed between a child link and a parent link. The child link may be a link between the IAB node and a child node (e.g., access node). The parent link may be a link between the IAB node and a parent node.

The non-TDM scheme 1 may be an MT-TX/DU-TX scheme, the non-TDM scheme 2 may be the MT-TX/DU-RX scheme, the non-TDM scheme 3 may be the MT-RX/DU-TX scheme, and the non-TDM scheme 4 may be an MT-RX/DU-RX scheme. The non-TDM scheme 1 and the non-TDM scheme 4 may be a two-way relay (TWR) communication scheme.

Meanwhile, in sidelink communication, a relay node (e.g., relay node supporting functions of an IAB node) may be introduced. In sidelink communication, the relay node may be used for extension of sidelink coverage (e.g., UE-to-UE coverage), extension of network coverage (e.g., UE-to-network coverage), and/or improvement of power efficiency. In an out-of-coverage environment or an in-network coverage environment, sidelink broadcast communication, sidelink groupcast communication, and/or sidelink unicast communication may be performed.

Figure 8A:
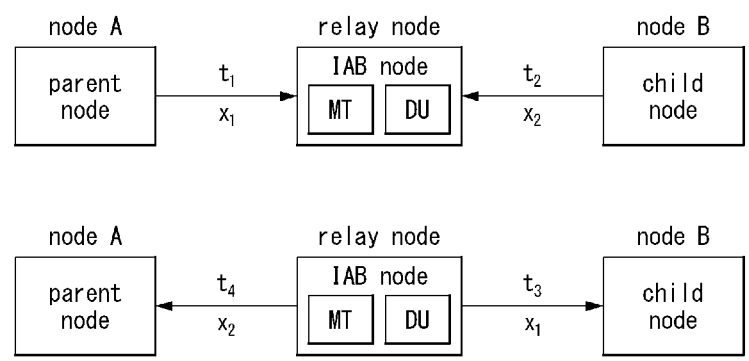
FIG. 8A is a conceptual diagram illustrating a first exemplary embodiment of a TWR communication method.

FIG. 8A is a conceptual diagram illustrating a first exemplary embodiment of a TWR communication method.

Referring to FIG. 8A, a relay node may be an IAB node, a node A may be a parent node, and a node B may be a child node or an access node. The relay node may be located between the node A and the node B, and may relay data transmissions between the node A and the node B. The node A may transmit first data $x_1$ to the relay node at a first time $t_1$, and the node B may transmit second data $x_2$ to the relay node at a second time $t_2$. The relay node may transmit the first data $x_1$ to the node B at a third time $t_3$, and may transmit the second data $x_2$ to the node A at a fourth time $t_4$. In this case, for data relaying between the node A and the node B, four slots (e.g., $t_1$, $t_2$, $t_3$, $t_4$) may be required. The relay node may use the same resources (i.e., the same time and frequency resources) to perform the reception operation of the first data $x_1$ and the second data $x_2$ and the transmission operation of the first data $x_1$ and the second data $x_2$, respectively. In this case, the efficiency of resource (e.g., spectrum) use may be improved, but a reception performance may be deteriorated due to interference.

The TWR communication method may be applied to sidelink communication as well as IAB communication. Although a TWR communication method applied to IAB communication will be described in exemplary embodiments below, the TWR communication method may be applied not only to IAB communication but also to other communications including sidelink communication.

Figure 8B:
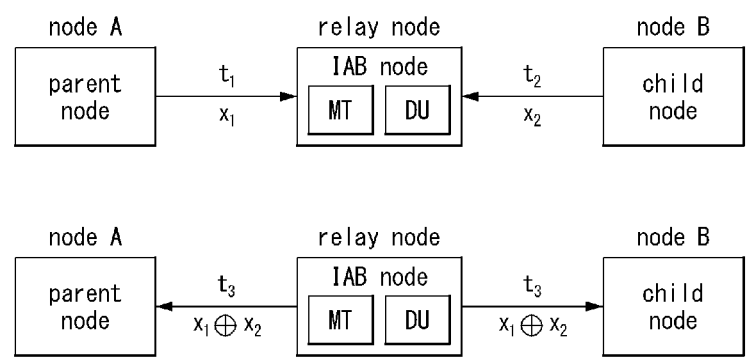
FIG. 8B is a conceptual diagram illustrating a first exemplary embodiment of a network coding (NC)-based TWR communication method.

FIG. 8B is a conceptual diagram illustrating a first exemplary embodiment of a network coding (NC)-based TWR communication method.

Referring to FIG. 8B, a relay node may be an IAB node, a node A may be a parent node, and a node B may be a child node or an access node. In sidelink communication, each of the relay node, the node A, and the node B may be a terminal (e.g., vehicle to everything (V2X) terminal or device-to-device (D2D) terminal). In exemplary embodiments, control information may refer to uplink control information (UCI), downlink control information (DCI), and/or sidelink control information (SCI). In exemplary embodiments, each of UCI and DCI may be replaced with SCI.

In order to improve the efficiency of resource use, the relay node may perform a network coding (NC) operation in a signal (e.g., data) transmission procedure. In an exemplary embodiment, NC may refer to physical network coding (PNC). When an NC operation is applied, the relay node may perform an exclusive OR (XOR) operation on the first data $x_1$ received from the node A and the second data $x_2$ received from the node B to generate NC data $x_1 \oplus x_2$, and transmit the NC data $x_1 \oplus x_2$ to the nodes A and B. The node A may receive the NC data $x_1 \oplus x_2$ from the relay node, and may obtain the second data (e.g., the data transmitted from the node B to the node A) by performing an XOR operation on the NC data $x_1 \oplus x_2$ and the first data $x_1$ transmitted by the node A. For example, the node A may obtain the second data $x_2$ by performing a decoding operation as shown in Equation 1 below.

$$(x_1 \oplus x_2) \oplus x_1 = x_2 \quad \text{[Equation 1]}$$

The node B may receive the NC data $x_1 \oplus x_2$ from the relay node, and may obtain the first data (e.g., the data transmitted from the node A to the node B) by performing an XOR operation on the NC data $x_1 \oplus x_2$ and the second data $x_2$ transmitted by the node B. For example, the node B may obtain the first data $x_1$ by performing a decoding operation as shown in Equation 2 below.

$$(x_1 \oplus x_2) \oplus x_2 = x_1 \quad \text{[Equation 2]}$$

When the NC operation is applied, three slots (e.g., $t_1$, $t_2$, $t_3$) may be required for data relaying between the node A and the node B. The size (e.g., payload size) of the first data $x_1$ received from the node A may be different from the size (e.g., payload size) of the second data $x_2$ received from the node B. The relay node may perform appropriate power control and/or resource scheduling operations on the node A and the node B in order to receive data of the same size from the node A and the node B. However, when the sizes of actual data to be transmitted by the node A and the node B are different, the above-described power control and/or resource scheduling operations may be inefficient. NC operations applied to the first data $x_1$ and the second data $x_2$ having different sizes will be described in exemplary embodiments below.

Dummy data having a specific pattern may be preconfigured between the communication nodes (e.g., relay node, node A, and node B) performing relay communications. The dummy data having a specific pattern may be configured without signaling between the communication nodes. That is, the dummy data having a specific pattern may be predefined in a technical specification. Alternatively, the dummy data having a specific pattern may be configured through signaling between the communication nodes. The above-described dummy data may be zero padding.

The relay node may receive the first data $x_1$ from the node A and the second data $x_2$ from the node B. The relay node may add dummy data to data having a shorter length among the first data $x_1$ and the second data $x_2$, so that the length (e.g., size) of the first data $x_1$ and the second data $x_2$ can be matched equally. Thereafter, the relay node may perform an NC operation on the first data $x_1$ and the second data $x_2$ having the same length.

Figure 9:
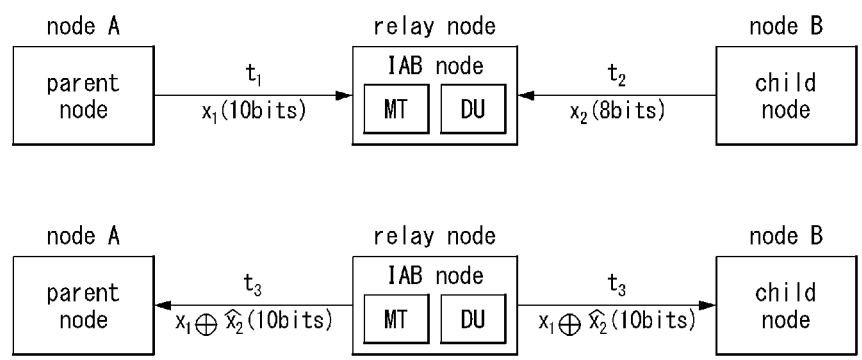
FIG. 9 is a conceptual diagram illustrating a first exemplary embodiment of a zero padding-based TWR communication method.

FIG. 9 is a conceptual diagram illustrating a first exemplary embodiment of a zero padding-based TWR communication method.

Referring to FIG. 9, a relay node may be an IAB node, a node A may be a parent node, and a node B may be a child node or an access node. The size of the first data $x_1$ received from the node A may be n bits (e.g., 10 bits), and the size of the second data $x_2$ received from the node B may be m bits (e.g., 8 bits). In this case, the relay node may add zero padding to the second data $x_2$ having a smaller size. For example, the relay node may add zero padding to a front part of the second data $x_2$, a rear part of the second data $x_2$, or between source bits of the second data $x_2$, so that the first data $x_1$ and the second data $x_2$ have the same size. The second data $x_2$ to which the zero padding is added may be referred to as third data $\widehat{x_2}$.

The relay node may generate NC data $x_1 \oplus \widehat{x_2}$ by performing an NC operation on the first data $x_1$ and the third data $\widehat{x_2}$, and transmit the NC data $x_1 \oplus \widehat{x_2}$ to the node A and the node B. The nodes A and B receiving the NC data $x_1 \oplus \widehat{x_2}$ may not know whether or not zero padding has been added, a zero padding addition scheme, and/or a difference between the first data $x_1$ and the second data $x_2$. Therefore, the relay node may transmit, to the node A and the node B, control information including information indicating whether or not zero padding has been added, information indicating the zero padding addition scheme, and/or information indicating the difference between the first data $x_1$ and the second data $x_2$. The above-described control information transmitted from the relay node to the parent node in the IAB network may be UCI, and the above-described control information transmitted from the relay node to the child node in the IAB network may be DCI. The above-described control information transmitted from the relay node to the parent node and the child node in sidelink communication may be SCI.

The relay node may transmit the NC data to the node A and the node B by using the same radio resources. When the relay node transmits the first data $x_1$ and the second data $x_2$ to which the NC operation is not applied by using the same radio resources, interference may occur between the first data $x_1$ and the second data $x_2$. When the first data $x_1$ and the second data $x_2$ are transmitted using different (i.e., orthogonal) radio resources, the size of radio resources required for the transmission of the first data $x_1$ and the second data $x_2$ may increases, thereby reducing the efficiency of resource use. In the TWR communication environment, the relay node may allocate the same radio resources for transmission of the NC data, and may transmit the NC data to the node A and the node B by using the allocated radio resources. Based on the relay node, the same uplink resources and the same downlink resources may be allocated for transmission of the NC data.

DCI including radio resource allocation information for transmission of the NC data may be referred to as NC-DCI. The NC-DCI may be transmitted from the parent node. The NC-DCI may be transmitted in each slot. The NC-DCI may be scrambled by a specific radio network temporary identifier (RNTI) (e.g., NC-RNTI). The relay node may perform a blind decoding operation on a specific region (e.g., search space, search space set, and/or the like). The blind decoding operation of the relay node may be performed using the NC-RNTI. The relay node may detect the NC-DCI scrambled by the NC-RNTI by performing the blind decoding operation using the NC-RNTI. When the NC-DCI is detected, the relay node may know that it should transmit the NC data to two communication nodes (e.g., parent node and child node). The relay node may transmit the NC data to the two communication nodes based on the radio resource allocation information included in the NC-DCI.

The parent node (e.g., node A) may transmit the NC-DCI together with the first data $x_1$. The first data $x_1$ and the NC-DCI may be transmitted in the same slot (or the same mini-slot). The NC-DCI may further include other information element(s) as well as the resource allocation information of the NC data. For example, the NC-DCI may include at least one of the resource allocation information of the NC data, an identifier of the child node (e.g., node B), modulation and coding scheme (MCS) information, resource allocation information of the first data $x_1$, resource allocation information of the second data $x_2$ (e.g., information on a time (i.e., reception time) when the relay node receives the second data $x_2$ of the node B), or combinations thereof. The information on the time when the second data $x_2$ is received may be defined as Δ.

Δ may be set to a negative value, zero, or a positive value. Δ may be set in units of symbols, mini-slots, slots, or subframes. Δ may indicate the reception time of the second data $x_2$ based on a reception time of the NC-DCI. That is, Δ may be an offset between the reception time of the NC-DCI and the reception time of the second data $x_2$. For example, when Δ is −2 and the NC-DCI is received in a slot #n, the relay node may determine that the second data $x_2$ is received in a slot #n−2. When Δ is +2 and the NC-DCI is received in the slot #n, the relay node may determine that the second data $x_2$ is received in a slot #n+2. When Δ is 0 and the NC-DCI is received in the slot #n, the relay node may determine that the second data $x_2$ is received in the slot #n. In the exemplary embodiment shown in FIG. 9, when the NC-DCI is received at the time $t_1$, Δ may be $t_2-t_1$, and a value of $t_2-t_1$ may exceed zero.

Figure 10:
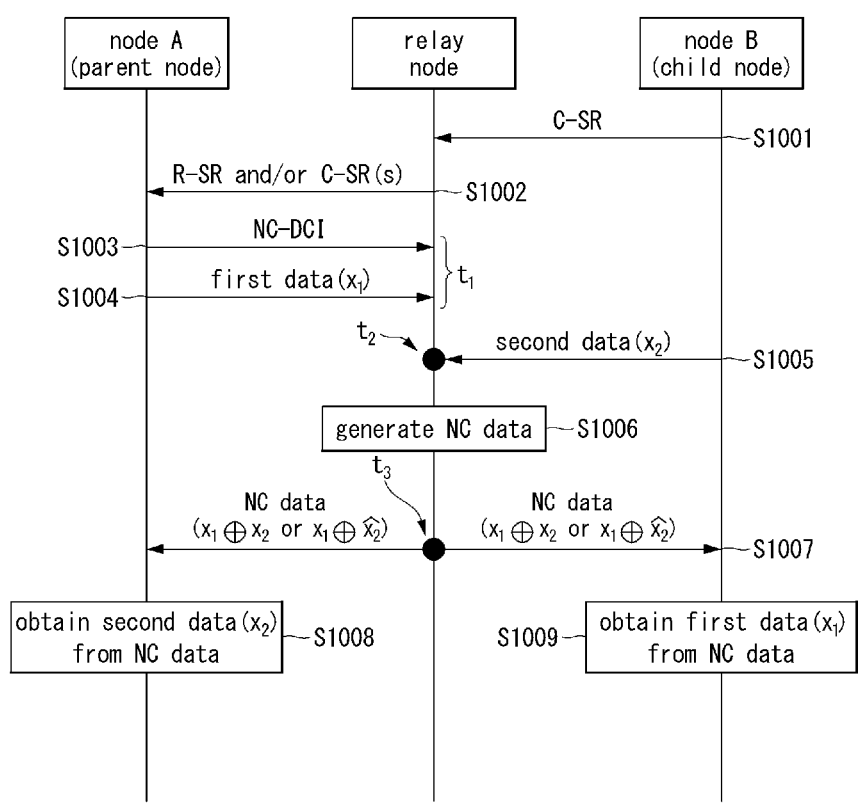
FIG. 10 is a sequence chart illustrating a first exemplary embodiment of a method for transmitting NC data.

FIG. 10 is a sequence chart illustrating a first exemplary embodiment of a method for transmitting NC data.

Referring to FIG. 10, a communication system may include a relay node, a node A, and a node B. The node A may be a parent node, and the node B may be a child node or an access node. When an NC data transmission method is applied to an IAB network, each of the relay node, the node A, and the node B may be an IAB node. Alternatively, the node A may be a donor node, and each of the relay node and the node B may be an IAB node. When the NC data transmission method is applied to sidelink communication, each of the relay node, the node A, and the node B may be a terminal (e.g., V2X terminal or D2D terminal).

When there is uplink data (e.g., second data) to be transmitted to the node A through the relay node, the node B may transmit a scheduling request (SR) indicating the existence of the uplink data to the relay node (S1001). In the exemplary embodiment of FIG. 10, the second data may mean uplink data transmitted from the node B. In the step S1001, the node B may transmit control information (e.g., UCI or SCI) including the SR to the relay node. The control information may be transmitted on a physical uplink control channel (PUCCH), a physical sidelink control channel (PSCCH), and/or a physical sidelink shared channel (PSSCH). In an exemplary embodiment, the SR of the node B (e.g., child node) may be referred to as child (C)-SR. The relay node may receive the C-SR from the node B, and may identify that the uplink data exists in the node B based on the C-SR.

In this case, the relay node may transmit control information (e.g., UCI or SCI) including the C-SR of the node B to the node A in order to inform the node B that the uplink data exists (S1002). The control information may be transmitted on a PUCCH, PSCCH, and/or PSSCH. When data to be transmitted to the node A exists in the relay node, the relay node may generate a relay (R)-SR indicating the existence of the data to be transmitted to the node A. The R-SR may be transmitted together with the C-SR in the step S1002. In addition, the relay node may receive one or more C-SR(s) from one or more child node(s). In this case, the control information transmitted in the step S1002 may include information on the R-SR and/or one or more C-SR(s). For example, the control information including information on the R-SR and two C-SRs may be configured as shown in Table 1 below.

TABLE 1

| R-SR | Number of C-SR(s) | ID of child node #1 | ID of child node #2 | Information element(s) |
|---|---|---|---|---|
| 1 | 10 | 101 | 110 | ... |

The size of the R-SR field may be 1 bit. The R-SR field set to a first value (e.g., 0) may indicate that uplink data does not exist in the relay node. The R-SR field set to a second value (e.g., 1) may indicate that uplink data exists in the relay node. The size of the field indicating the number of C-SR(s) may be x bits. x may be a natural number. For example, when x is 2, the field indicating the number of C-SR(s) may be defined as shown in Table 2 below.

TABLE 2

| bits | Number of C-SR(s) |
|---|---|
| 00 | 0 |
| 01 | 1 |
| 10 | 2 |
| 11 | 3 |

When the field indicating the number of C-SR(s) indicates none C-SR, the control information may not include the ID field(s) of the child node(s). When the field indicating the number of C-SR(s) indicates one or more C-SR(s), the control information may include the ID field(s) of the child node(s). When the number of C-SRs is two, the control information may include the ID field of the node B #1 and the ID field of the node B #2.

The number of C-RSs reported to the node A through the control information may not exceed a preset maximum number. The maximum number of C-RSs may be preset through signaling between the communication nodes (e.g., relay node, node A, and node B). Alternatively, the maximum number of C-RSs may be defined in a technical specification. The maximum number of C-RSs may be k, and the number of C-RSs received from the relay node may be p. Each of k and p may be a natural number. When p is less than or equal to k, the relay node may transmit control information including information of p C-SRs to the node A. When p exceeds k, the relay node may select k C-SR(s) from among the p C-SRs, and may transmit control information including information on the k C-SR(s) to the node A. The k C-SR(s) may be selected based on priorities thereof. The relay node may transmit control information including information on the remaining (p-k) C-SR(s) to the node A using the next available uplink resource.

In the step S1002, the node A may receive the control information from the relay node. The control information may include information on the R-SR and/or one or more C-SR(s). In the exemplary embodiment, it may be assumed that the control information received in the step S1002 includes the C-SR of the node B. The node A may identify that the uplink data (i.e., second data) exists in the node B based on the information element(s) included in the control information received from the relay node. Also, downlink data (i.e., first data) to be transmitted to the node B through the relay node may exist in the node A. In this case, it may be necessary to perform the NC operation on the first data $x_1$ and the second data $x_2$ in the relay node. Accordingly, the node A may generate NC-DCI and transmit the NC-DCI to the relay node (S1003). The NC-DCI may be scrambled by the NC-RNTI. The NC-DCI may include resource allocation information of the NC data, the identifier of the node B, MCS information, resource allocation information of the first data $x_1$, resource allocation information of the second data $x_2$ (e.g., a time (i.e., reception time) when the relay node receives the second data $x_2$ of the node B), or combinations thereof. The resource allocation information of the second data $x_2$ may be an uplink grant for the second data $x_2$. The resource allocation information of the second data $x_2$ may be transmitted through a separate DCI instead of the NC-DCI. The separate DCI may be transmitted at the same time $t_1$ (e.g., in the same slot) as the NC-DCI.

In addition, the node A may transmit the first data x1 to the relay node (S1004). The NC-DCI and the first data $x_1$ may be transmitted at the same time $t_1$ (e.g., in the same slot). Alternatively, the NC-DCI and the first data $x_1$ may be transmitted at different times (e.g., in different slots). The relay node may receive the NC-DCI and the first data $x_1$ from the node A. The relay node may obtain the NC-DCI by using the NC-RNTI, and may identify at least one of the resource allocation information of the NC data, the identifier of the node B, the MCS information, the resource allocation information of first data $x_1$, the resource allocation information of the second data $x_2$, or combinations thereof, which are included in the NC-DCI. Further, the relay node may transmit the NC-DCI to the node B. The node B may receive the NC-DCI from the relay node, and may identify the information element(s) included in the NC-DCI.

Meanwhile, the node B may transmit the second data $x_2$ to the relay node (S1005). The relay node may receive the second data $x_2$ from the node B based on the resource allocation information indicated by the NC-DCI. The second data $x_2$ may be received at the time $t_2$. The relay node may generate NC data $x_1 \oplus x_2$ by performing an NC operation on the first data $x_1$ and the second data $x_2$ (S1006). In the step S1006, the NC operation may be performed based on zero padding. For example, if the size of the second data $x_2$ is smaller than the size of the first data $x_1$, the relay node may add zero padding to the second data $x_2$ to generate the third data $\widehat{x_2}$, and may generate NC data $x_1 \oplus \widehat{x_2}$ by performing an NC operation on the first data $x_1$ and the third data $\widehat{x_2}$.

The relay node may transmit the NC data ($x_1 \oplus x_2$ or $x_1 \oplus \widehat{x_2}$) to the node A and the node B using the same radio resources (S1007). The NC data may be transmitted through the resources indicated by the resource allocation information included in the NC-DCI. For example, the NC data may be transmitted at the time $t_3$. The node A may receive the NC data from the relay node, and may obtain the second data $x_2$ by performing an XOR operation on the NC data (S1008). The node B may receive the NC data from the relay node, and may obtain the first data $x_1$ by performing an XOR operation on the NC data (S1009).

Hereinafter, TWR communication methods based on an NC operation and/or superposition coding (SPC) operation will be described. The SPC operation may be a non-orthogonal multiple access (NOMA) operation. Each of an MT and a DU included in an IAB node may transmit data to each communication node using an independent antenna panel. Alternatively, the IAB node may transmit data to each communication node using independent beams from one antenna panel. In this case, as in the exemplary embodiment shown in FIG. 9, it may be a waste of resources for the relay node to transmit NC data generated based on an NC operation based on zero padding. To solve this problem, when the size of the first data $x_1$ is different from the size of the second data $x_2$, NC data may be generated based on data having a smaller size.

Figure 11:
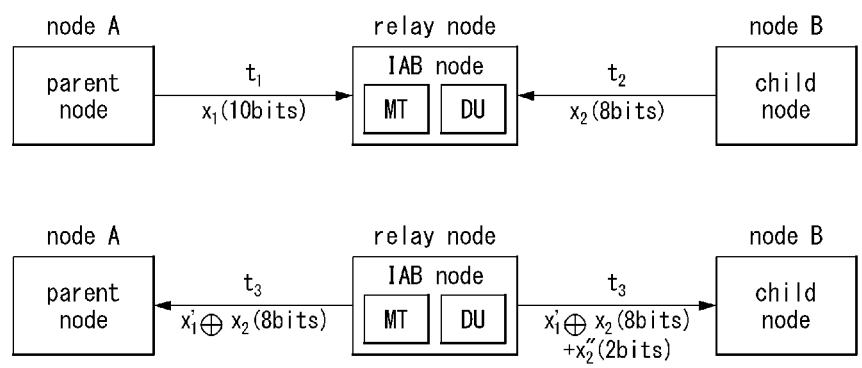
FIG. 11 is a conceptual diagram illustrating a second exemplary embodiment of an NC-based TWR communication method.

FIG. 11 is a conceptual diagram illustrating a second exemplary embodiment of an NC-based TWR communication method.

Referring to FIG. 11, a relay node may be an IAB node, a node A may be a parent node, and a node B may be a child node or an access node. The size of the first data $x_1$ received from the node A may be 10 bits, and the size of the second data $x_2$ received from the node B may be 8 bits. In this case, the relay node may truncate some bits of the first data $x_1$ to fit the size of the second data $x_2$ having a smaller size among the first data $x_1$ and the second data $x_2$. That is, the relay node may generate first truncated (T)-data $x'_1$ by truncating some bits from the first data $x_1$. Among 10 bits of the first data $x_1$, the remaining data other than the first T-data $x'_1$ may be first remaining (R)-data $x''_1$ having 2 bits. The first T-data $x'_1$ and the first R-data may be generated by the relay node.

The relay node may generate NC data $x'_1 \oplus x_2$ by performing an NC operation on the first T-data $x'_1$ and the second data $x_2$, and may transmit the NC data $x'_1 \oplus x_2$ to the node A. Also, the relay node may transmit the NC data $x'_1 \oplus x_2$ and the first R-data $x''_1$ to the node B. In this case, unnecessary resource waste for transmission of the NC data $x'_1 \oplus x_2$ may be prevented. The transmission of the NC data $x'_1 \oplus x_2$ and the first R-data $x''_1$ may be performed as follows.

Figure 12:
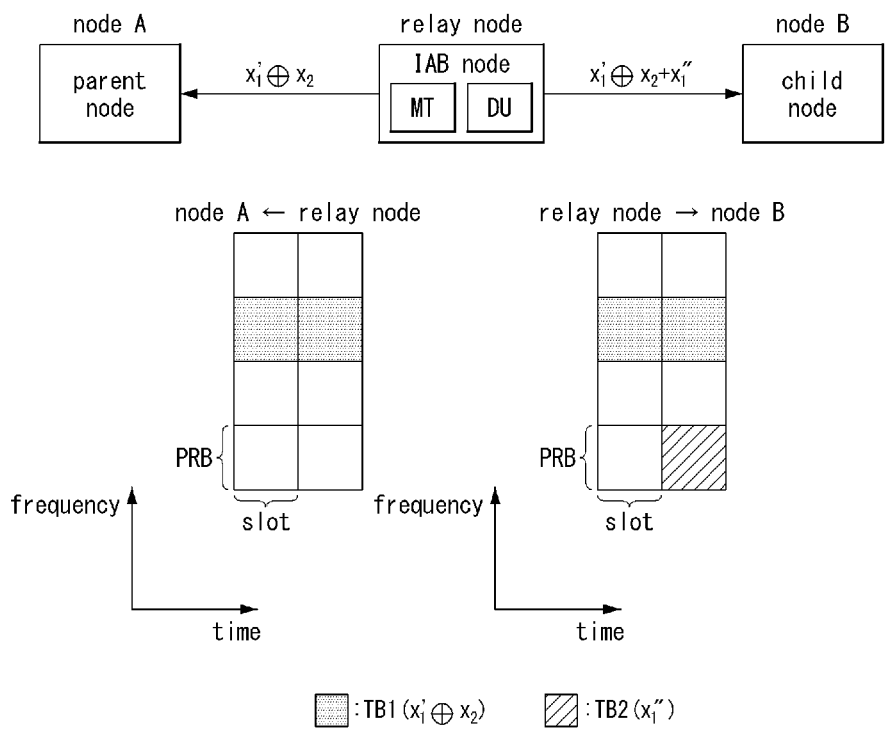
FIG. 12 is a conceptual diagram illustrating a first exemplary embodiment of a method of transmitting the NC data $x'_1 \oplus x_2$ and the first R-data $x''_1$.

FIG. 12 is a conceptual diagram illustrating a first exemplary embodiment of a method of transmitting the NC data $x'_1 \oplus x_2$ and the first R-data $x''_1$.

Referring to FIG. 12, the relay node may generate a transport block TB1 for the NC data $x'_1 \oplus x_2$, and may generate a TB2 for the first R-data $x''_1$. That is, the relay node may generate an independent TB for each of the NC data $x'_1 \oplus x_2$ and the first R-data $x''_1$. The relay node may transmit the TB1 and the TB2 using orthogonal resources. For example, the relay node may transmit the TB1 to the node A and node the B in a first resource region, and may transmit the TB2 to the node B in a second resource region. The first resource region and the second resource region may be orthogonal in the time and frequency domains.

Alternatively, the relay node may perform an SPC operation on the NC data $x'_1 \oplus x_2$ and the first R-data $x''_1$. NC-modulation symbols $y_{NC}(\ )$ of the NC data $x'_1 \oplus x_2$ may be defined as in Equation 3 below.

$$x'_1 \oplus x_2 \xrightarrow{\text{modulation}} y_{NC}(0), y_{NC}(1), \ldots, y_{NC}(N_{NC}-1) \quad \text{[Equation 3]}$$

R-modulation symbols $y_1(\ )$ of the first R-data $x''_1$ may be defined as in Equation 4 below.

$$x''_1 \xrightarrow{\text{modulation}} y_1(0), y_1(1), \ldots, y_1(N_1-1) \quad \text{[Equation 4]}$$

The length of the NC-modulation symbols may be $N_{NC}$, and the length of the R-modulation symbols may be $N_1$. The number of modulation symbols to which the SPC operation is applied may be min ($N_{NC}, N_1$).

Figure 13:
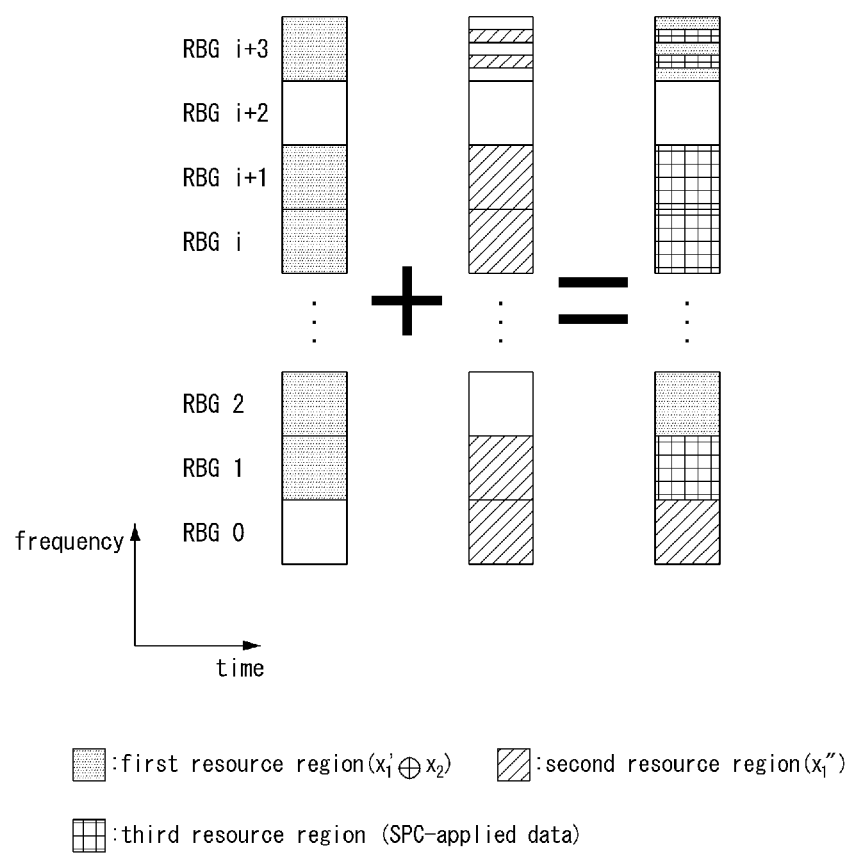
FIG. 13 is a conceptual diagram illustrating a first exemplary embodiment of a method of applying an SPC operation to the NC data $x'_1 \oplus x_2$ and the first R-data $x''_1$.

FIG. 13 is a conceptual diagram illustrating a first exemplary embodiment of a method of applying an SPC operation to the NC data $x_1 \oplus x_2$ and the first R-data $x''_1$.

Referring to FIG. 13, $N_{NC}$ may exceed $N_1$. The NC-modulation symbols may be allocated to the first resource region, and the R-modulation symbols may be allocated to the second resource region. Each of the first resource region and the second resource region may be configured in units of resource blocks (RBs) or resource block groups (RBGs).

An RBG may include one or more RBs. The relay node may determine a set of RBGs to which the SPC operation is applied by performing a channel measurement operation in units of RBGs. For example, overlapped resources (i.e., third resource region) between the first resource region and the second resource region may be determined as the set of RBGs to which the SPC operation is applied. The relay node may perform the SPC operation on the NC data $x'_1 \oplus x_2$ and the first R-data $x''_1$ in the set of RBGs (i.e., third resource region), and transmit a result of the SPC operation to the node B. A signal transmitted in the i-th RBG set among the set of RBGs (i.e., third resource region) may be defined as in Equation 5 below.

$$\alpha_i \cdot y_{NC}(i,k,l) + (1-\alpha_i) \cdot y_1(i,k,l) \qquad \text{[Equation 5]}$$

In Equation 5, a may be a power coefficient, k may be a subcarrier index, and l may be a symbol index. The node B (e.g., receiving communication node) may perform an SPC demodulation operation in the third resource region, and may perform a general signal demodulation operation in the first resource region and the second resource region. In order to support the above-described operations, the relay node may transmit, to the node B, control information including at least one of information of the first resource region (i.e., the resource region to which the NC data $x'_1 \oplus x_2$ is mapped), information of the second resource region (i.e., the resource region to which the first R-data $x''_1$ is mapped), information of the third resource region (i.e., the resource region to which the result of performing the SPC operation on the NC data $x'_1 \oplus x_2$ and the first R-data $x''_1$ is mapped), information of the power coefficient (i.e., a) for the SPC operation, MCS information of the NC data $x'_1 \oplus x_2$, MCS information of the first R-data $x''_i$, or combinations thereof. The node B may receive the above-described control information from the relay node, and may receive the NC data $x'_1 \oplus x_2$ and the first R-data $x''_1$ based on the control information. The information of the first resource region, the information of the second resource region, and the information of the third resource region may be expressed in form of a bitmap.

The power coefficient α may be applied differently for each RBG belonging to the set of RBGs (i.e., third resource region). The node B (e.g., receiving communication node) may determine the power coefficient α for each RBG, and transmit information on the power coefficient α for each RBG to the relay node (e.g., transmitting communication node). The relay node may perform the SPC operation based on the power coefficient α for each RBG received from the node B. Alternatively, the relay node may receive a reference signal from the node B, and may measure a channel state for each RBG based on the reference signal. The relay node may determine the power coefficient α for each RBG based on the measured channel state, and may perform the SPC operation based on the power coefficient α for each RBG.

Since the size $N_1$ of the first R-data $x''_1$ is smaller than the size $N_{NC}$ of the NC data $x'_1 \oplus x_2$, the first R-data $x''_1$ may not be mapped to some RBs in an RBG. For example, the first R-data $x''_1$ may not be mapped to some RBs in the RBG i+3.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a relay node in a communication system, the operation method comprising:
   receiving, from a first communication node, first data composed of n bits;
   receiving, from a second communication node, second data composed of m bits;
   in response to determining that n is greater than m, generating first truncated (T)-data composed of m bits excluding some bits from the first data and generating first remaining (R)-data composed of (n-m) bits excluding the first T-data from the first data;
   generating third data by performing a network coding (NC) operation on the first T-data and the second data which have same size;
   transmitting the third data to the first communication node; and
   transmitting the third data and the first R-data to the second communication node,
   wherein each of n and m is a natural number.

2. The operation method according to claim 1, further comprising:
   receiving, from the second communication node, a child scheduling request (C-SR) indicating that the second data exists in the second communication node;
   transmitting, to the first communication node, control information including information on the C-SR; and
   receiving, from the first communication node, NC downlink control information (NC-DCI) including resource allocation information of the second data,
   wherein the receiving of the second data is performed based on the resource allocation information included in the NC-DCI.

3. The operation method according to claim 2, wherein the resource allocation information is an offset between a reception time of the NC-DCI and a reception time of the second data.

4. The operation method according to claim 2, wherein the control information further includes a relay (R)-SR indicating whether uplink data to be transmitted to the first communication node exists in the relay node, and the information on the C-SR includes a number of C-SR(s) and an identifier of each of one or more second communication nodes having transmitted the C-SR(s).

5. The operation method according to claim 2, wherein when a maximum number of C-SR(s) reportable through the control information is k, the number of C-SR(s) received from the relay node is p, and p is greater than k, k C-SR(s) are selected from among p C-SR(s) received from the relay node, and the control information includes information on the selected k C-SR(s).

6. The operation method according to claim 2, wherein the NC-DCI further includes at least one of resource allocation information of the first data, resource allocation information of the third data, a power coefficient for a superposition coding (SPC) operation, an identifier of the second communication node, modulation and coding scheme (MCS) information, or combinations thereof.

7. The operation method according to claim 2, wherein the first data and the NC-DCI are received in a same slot.

8. The operation method according to claim 1, wherein the third data is transmitted through a first resource region, the first R-data is transmitted through a second resource region, and the first resource region and the second resource region are independently configured.

9. The operation method according to claim 1, wherein the transmitting of the third data and the first R-data comprises:
identifying an overlapping third resource region between a first resource region to which the third data is mapped and a second resource region to which the first R-data is mapped;
transmitting a result of an SPC operation on the third data and the first R-data to the second communication node through the third resource region;
transmitting the third data to the second communication node through a remaining resource region excluding the third resource region from the first resource region; and
transmitting the first R-data to the second communication node through a remaining resource region excluding the third resource region from the second resource region.

10. The operation method according to claim 9, wherein the third resource region is configured in units of resource block groups (RBGs), and a power coefficient for the SPS operation is configured for each RBG.

11. The operation method according to claim 1, wherein the first data is received at a first time, the second data is received at a second time, and a transmission operation to the first communication node and a transmission operation to the second communication node are performed simultaneously.

12. The operation method according to claim 1, wherein when the communication system supports integrated access and backhaul (IAB) communication, the relay node is an IAB node, the first communication node is a parent node, and the second communication node is a child node, and when the communication system supports sidelink communication, each of the relay node, the first communication node, and the second communication node is a terminal performing the sidelink communication.

13. A relay node in a communication system, the relay node comprising:
a processor;
a memory electronically communicating with the processor; and
instructions stored in the memory,
wherein when executed by the processor, the instructions cause the relay node to:
receive, from a first communication node, first data composed of n bits;
receive, from a second communication node, second data composed of m bits;
in response to determining that n is greater than m, generate first truncated (T)-data composed of m bits excluding some bits from the first data and generate first remaining (R)-data composed of (n-m) bits excluding the first T-data from the first data;
generate third data by performing a network coding (NC) operation on the first T-data and the second data which have same size;
transmit the third data to the first communication node; and
transmit the third data and the first R-data to the second communication node,
wherein each of n and m is a natural number.

14. The relay node according to claim 13, wherein the instructions cause the relay node to:
receive, from the second communication node, a child scheduling request (C-SR) indicating that the second data exists in the second communication node;
transmit, to the first communication node, control information including information on the C-SR; and
receive, from the first communication node, NC downlink control information (NC-DCI) including resource allocation information of the second data,
wherein the receiving of the second data is performed based on the resource allocation information included in the NC-DCI.

15. The relay node according to claim 14, wherein the resource allocation information is an offset between a reception time of the NC-DCI and a reception time of the second data.

16. The relay node according to claim 14, wherein the control information further includes a relay (R)-SR indicating whether uplink data to be transmitted to the first communication node exists in the relay node, and the information on the C-SR includes a number of C-SR(s) and an identifier of each of one or more second communication nodes having transmitted the C-SR(s).

17. The relay node according to claim 14, wherein when a maximum number of C-SR(s) reportable through the control information is k, the number of C-SR(s) received from the relay node is p, and p is greater than k, k C-SR(s) are selected from among p C-SR(s) received from the relay node, and the control information includes information on the selected k C-SR(s).

18. The relay node according to claim 13, wherein the third data is transmitted through a first resource region, the first R-data is transmitted through a second resource region, and the first resource region and the second resource region are independently configured.

19. The relay node according to claim 13, wherein in the transmitting of the third data and the first R-data, the instructions cause the relay node to:
identify an overlapping third resource region between a first resource region to which the third data is mapped and a second resource region to which the first R-data is mapped;
transmit a result of an SPC operation on the third data and the first R-data to the second communication node through the third resource region;
transmit the third data to the second communication node through a remaining resource region excluding the third resource region from the first resource region; and
transmit the first R-data to the second communication node through a remaining resource region excluding the third resource region from the second resource region.

20. The relay node according to claim 19, wherein the third resource region is configured in units of resource block groups (RBGs), and a power coefficient for the SPS operation is configured for each RBG.

* * * * *

UNITED STATES PATENT AND TRADEMARK OFFICE
CERTIFICATE OF CORRECTION

PATENT NO. : 11,979,227 B2
APPLICATION NO. : 17/541363
DATED : May 7, 2024
INVENTOR(S) : Jun Hyeong Kim et al.

It is certified that error appears in the above-identified patent and that said Letters Patent is hereby corrected as shown below:

On the Title Page

Item (72) Inventors: Jun Hyeong Kim, Daejeon(KR); Gyu Il Kim, Daejeon(KR); Go San Noh, Daejeon (KR); Hee Sang Chung, Daejeon (KR); Dae Soon Cho, Daejeon (KR); Sung Woo Choi, Daejeon(KR); Seung Nam Choi, Daejeon(KR); Jung Pil Choi, Daejeon(KR)" need to be deleted and replaced with following:
(72) Inventors: Jun Hyeong Kim, Daejeon (KR); Il Gyu Kim, Daejeon (KR); Go San Noh, Daejeon (KR); Hee Sang Chung, Daejeon (KR); Dae Soon Cho, Daejeon (KR); Sung Woo Choi, Daejeon (KR); Seung Nam Choi, Daejeon (KR); Jung Pil Choi, Daejeon (KR)

Signed and Sealed this
Eleventh Day of June, 2024

*Katherine Kelly Vidal*

Katherine Kelly Vidal
*Director of the United States Patent and Trademark Office*